Oct. 1, 1957   R. M. SHERMAN   2,808,275
SUCTION COUPLING WITH FLUID PRESSURE ACTUATED SEAL
Filed Sept. 27, 1954   2 Sheets-Sheet 1
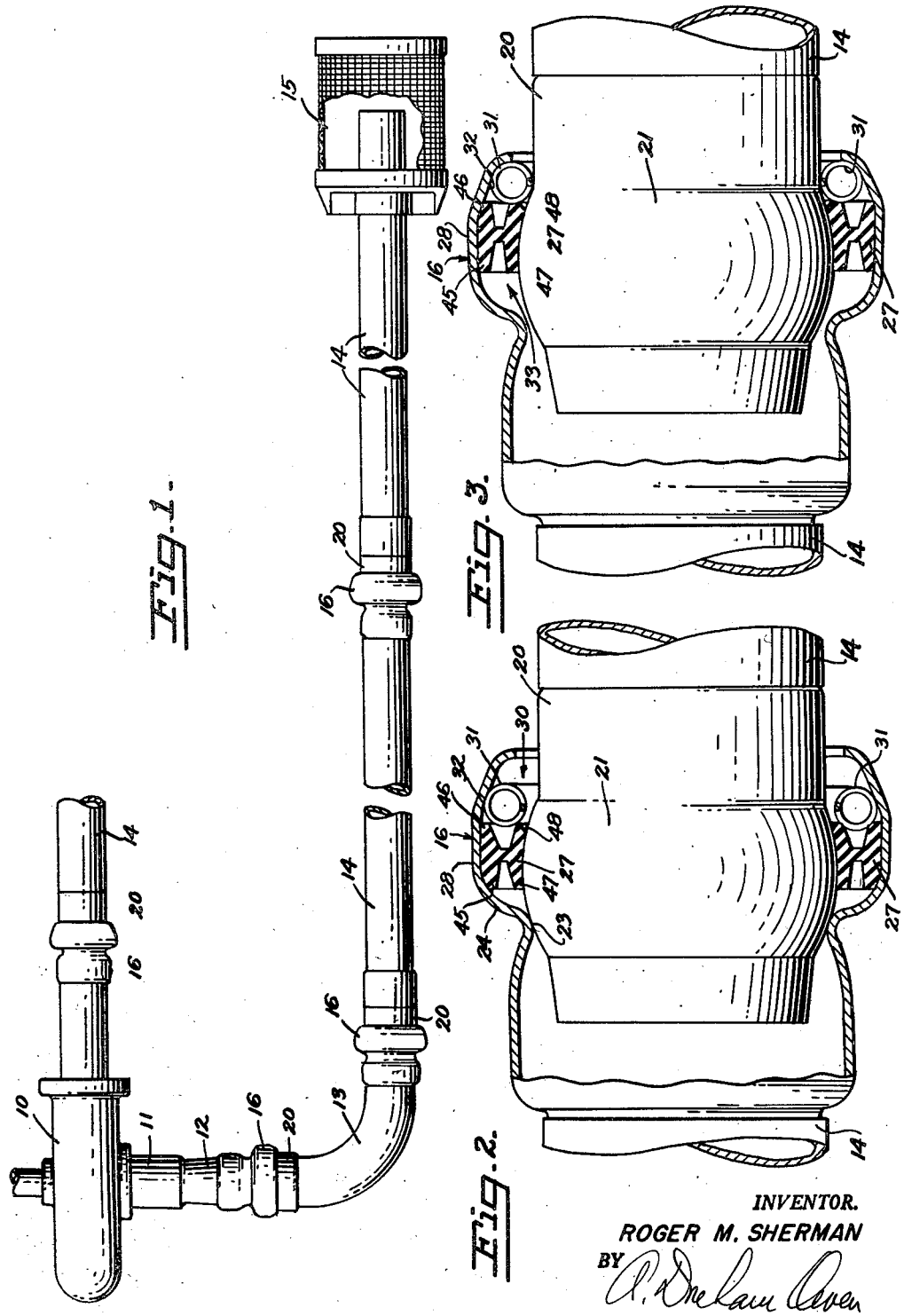
INVENTOR.
ROGER M. SHERMAN
BY
ATTORNEY

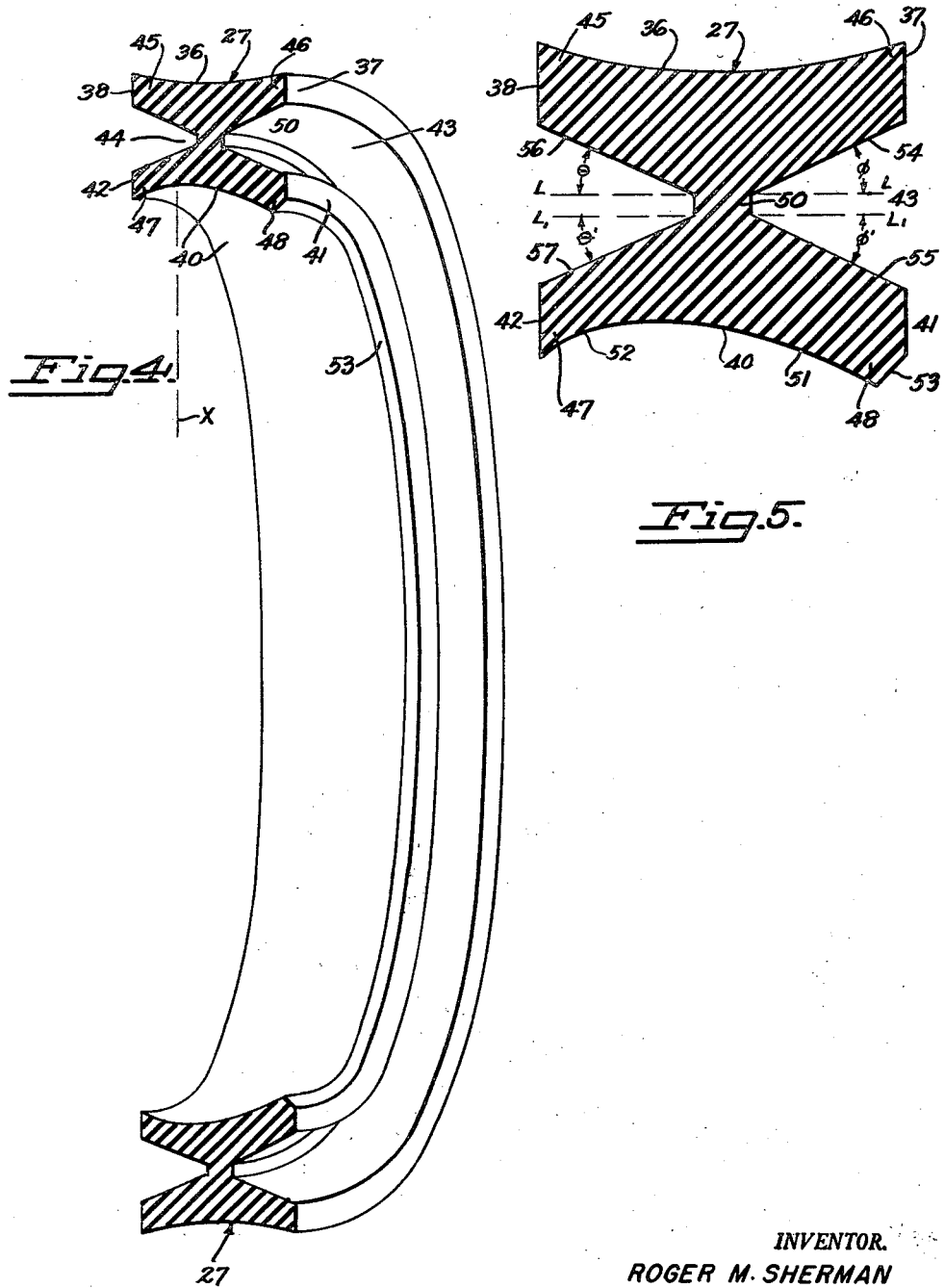

2,808,275

SUCTION COUPLING WITH FLUID PRESSURE ACTUATED SEAL

Roger M. Sherman, Palo Alto, Calif., assignor to W. R. Ames Company, San Francisco, Calif., a corporation of California Application September 27, 1954, Serial No. 458,441

3 Claims. (Cl. 285—104)

This invention relates to improvements in mechanically interlocked couplers and is illustrated herein as it is applied in coupling together sections of pipe.

The problem solved by this invention is how to provide a quickly severable coupling which can be used in a suction pipe line. Such a quickly severable coupling is shown in the patent to Sherman et al. 2,638,362 but until this invention it has not been adapted to efficient use in suction pipe lines. Heretofore, the only pipe couplers that were suitable for suction work were those equipped with screws, bolts, or other manually tightenable clamp members. These were difficult and time consuming to apply.

The present invention makes it possible to provide a string of pipes joined by leak-tight, quickly severable couplings for use, without adjustment, both in a pressure system or in a suction system. This new result has been achieved by a combination of the ball-and-bell coupler of Patent 2,638,362 with a double lipped gasket. The oppositely projecting lips utilize whichever pressure is present to seal the coupling joint, without affecting the basic easy severability of the coupling.

A complete understanding of how the new coupling achieves the novel result, together with other objects and advantages of the invention, will appear from the following detailed description given in accordance with 35 U. S. C. 112.

In the drawings:

Fig. 1 is a view in elevation, somewhat diagrammatic in nature, of a suction system employing several pipe connections where the couplers are of the severable type embodying the present invention. The pipes in some cases, are shown broken to conserve space.

Fig. 2 is a view in elevation and in section of one of these coupling members, showing the parts in the position they assume when the pressure inside the pipe is below atmospheric pressure, as in a suction line attached to a pump.

Fig. 3 is a view similar to Fig. 2 with the parts in the position they assume when the pressure inside the pipe is greater than that outside it, as in an irrigation system attached to the outlet side of the pump.

Fig. 4 is an enlarged isometric view in section of a portion of the gasket of Figs. 2 and 3.

Fig. 5 is an enlarged cross-section of the gasket.

As noted earlier, the present invention extends the usefulness of the pipe coupler of Patent 2,638,362 for either suction or pressure installations.

Some farmers' source of irrigation water is a stream or ditch alongside their land, in which case it is necessary to lift the water from the stream up onto the land and thereafter to force it under pressure through suitable piping to the various outlets where it flows onto the soil. I have discovered that by combining the coupling of Patent 2,638,362 with a double chevron gasket, the farmer, using couplings so equipped, can make up the suction line and the pressure line from the same couplings. This means the farmer does not have to distinguish between couplings suitable for just one use. It is usual to employ a suction pump 10 on the bank of the stream and to couple to its inlet side as many lengths of pipe 14 as are needed to reach into the stream. At the bottom is placed a strainer 15 and at the top are suitable pipe sections 11, 12 and an elbow 13. The pipe sections 14, 12 and elbow 13 have in common the coupling parts 16 and 20 by means of which the farmer can quickly assemble or disassemble the line when moving it from place to place about his farm. On the outlet (pressure) side of the pump 10 he connects other sections of pipe 14 which convey the water out over the land to a sprinkler system or into an irrigating ditch. All sections of pipe 14 are connected by couplings as shown in Figs. 2 and 3.

Fig. 2 shows the cooperative relationship of the male and female coupling members, the sealing gasket and the locking spring when connected to and operating on the suction (inlet) side of the pump 10, and Fig. 3 shows these parts when connected to and operating on the pressure (outlet) side of the pump.

When connected to the suction side of the pump (Fig. 2) the male coupling element 20 with its ball portion 21 is brought up tight against the inner end or internal annular restriction 23 of the flared section 24 of the female coupling element 16. The lips 46 and 48 of the double chevron gasket 27 are wedged tightly between the cylindrical section 28 of the female section and the ball 21 of the male section as the reduced pressure inside the coupling causes pressure to be exerted in the direction of the arrow 30 in Fig. 2. This pressure applied over the whole face of the gasket 27 and particularly to its lips 46 and 48 effects a fluid tight seal by these lips on the ball and bell respectively. Thus the ball 21 functions to hold the coupling parts in a predetermined axial relationship while the sealing lips 46 and 48 seal the gap between the ball 21 and the surrounding wall 28.

When connected to the pressure side of the pump (Fig. 3) the male coupling element 20 with its ball portion 21 is brought up tight against the helical spring 31 for the latter is moved down the inclined inner face 32 of the female coupling member as pressure builds up in the pipe 14 and pushes the sealing gasket 27 in the direction of the arrow 33 in Fig. 3. The lip 46 pushes the spring along the face 32 while the lips 45 and 47 seal against the ball 21 and wall 28 of the coupling parts. The spring 31 interlocks the coupling parts while the gasket 27 assumes the additional function of sealing the parts so no fluid escapes.

By studying Figs. 2 and 3 where the parts are identical, but are capable of assuming two different operative conditions, depending upon whether the pipes they couple together are under minus (Fig. 2) or plus (Fig. 3) pressure, it will be seen that the farmer having his couplings so equipped can use the pipe on either a suction line or a pressure line. This is a great convenience and simplification for as the farm hands move the sections of pipe from one pumping location to another, no care or special attention need be given to make certain that the couplings are not mixed.

Further inspection of Figs. 2 and 3 will show that the pipe system retracts slightly and becomes somewhat shorter under negative interior pressure, and the cooperation of the spherical enlargement and the interior annular restriction permit the pipe sections to move angularly relative to each other in the manner set forth in the application of P. Boissou, Serial No. 239,140, filed September 2, 1939, published by the Alien Property Custodian, May 25, 1943. Under the influence of positive interior pressure, the pipe sections move to the position of Fig. 3, extending slightly, and the locking means forms a bearing for the spherical enlargement permitting relative angular movement of the pipe sections as shown in the patent to Sherman et al., supra.

One form of gasket 27 which has proven very effective in this new combination is shown enlarged in Figs. 4 and 5. In cross section it is something like an H. However, the H is not a straight H as in the Roman alphabet but is more like two opposed V's with a common vertex, and might be called a double chevron gasket.

The outer axial rim 36 of the gasket 27 is preferably a concave, spherical segment with a radius approximately twice its axial length and with its center located along a line midway between the gasket's two radial faces 37 and 38. The inner face 40 is also concave, but is preferably not a simple curve, as will be discussed later.

The radial faces 37 and 38 and 41 and 42 are preferably truly perpendicular to the axis. Faces 37 and 41, and faces 38 and 42 are separated by generally V-shaped grooves 43 and 44, which form outer lips 45 and 46 and inner lips 47 and 48. These lips are connected by the thin center web 50. The radial extent of the web 50 is small, approaching zero. In a gasket for a 9 inch pipe it is preferably only about ⅛ of an inch.

The inner face 40 preferably is composed of two consecutive curves, one curved section 51 having a radius several times as great as the adjacent curved section 52. In other words, there is less crown in the section 51 than in the section 52. A beveled corner 53 may be provided between the larger radial curve 51 and the lip 41.

In a typical gasket 27 having an over-all diameter of 9⅛", the outer axial face 36 was arched to a depth of about ⅛" midway between its ends. The radius of curvature of the face 36 was about 2⁵³⁄₆₄". The radial faces 37 and 38 were 1³⁄₁₆" apart. The V grooves were about 1" across at the wide end and about ⅛" across at their vertices. The axial length of the web 50 was about ³⁄₁₆". The angle φ between the inner edge 54 of the lip 46 and a line L parallel to the axis of the gasket was about 24°22'. The angle φ' between a line L' parallel to the axis and the inner edge 55 of the lip 48 in the particular gasket was about 27°18'. The angle θ between the edge 56 of the outer lip 45 and the line L parallel to the axis was about 24°22' and the angle θ' between the edge 59 of the inner lip 47 and the line L' was also about 24°22'. The inner axial face 40 was made up of a curved section 51 having a 1²⁵⁄₆₄" radius from a center on a plane X ¹¹⁄₃₂" inwardly from the face 42 and a curved section 52 having a ¹⁹⁄₃₂" radius from a center along the same radial plane X. The bevel 53 was cut at 30° to the axis.

While proportions have been given as an illustration, these proportions are not the only ones that are satisfactory. They serve merely to illustrate desirable proportions in a gasket. These will vary with the diameter of the gasket.

One new result obtained by using the double chevron gasket in this new environment is that when there is a positive pressure in the pipe 14, the gasket 27 acts as a piston to move the lock spring 31, and when there is a negative pressure in the pipe 14, the gasket 27 releases the spring 31 and seals the joint against leakage from the outside as the lip 45 locks against the rim 28. The double chevron gasket acts a piston one way, while at the same time acting as a sealing member in that direction; and, when the pressure reverses it acts in the opposite direction, as a sealing member and to release the spring 31.

To those skilled in the art to which this invention relates, changes in construction and differing embodiments and applications of the invention will suggest themselves without departing from the spirit and scope of the invention. The disclosures and the description herein are illustrative and are not intended to be in any sense limiting.

What is claimed is:

1. In a pipe system for facile assembly and disassembly comprising a plurality of interconnected pipe sections, a pipe coupling for adjacent interconnected pipe sections, said pipe coupling being adapted to effectively seal the adjacent pipe sections under both positive and negative pressure, said pipe coupling comprising telescopically arranged complimentary bell and spigot portions adjacent the free ends of each pipe section, said portions in coupled relation having opposed surfaces, said bell and spigot portions being relatively movable longitudinally in a direction to extend the pipe system under the influence of positive internal pressure and in a direction to retract the pipe system under the influence of negative internal pressure, the spigot portion including a substantially spherical enlargement of less outer diameter than the internal diameter of the bell portion defining an annular space therebetween, the bell portion having an internal annular restriction of a diameter smaller than the outer diameter of the spherical enlargement of the spigot portion, the inner surface of the bell portion defining an interior compression wall sloping toward the free end and radially inwardly toward the longitudinal axis of the respective pipe section and terminating in a radially inturned annular flange at the free end thereof, said flange having an internal diameter slightly larger than the outer diameter of the spherical enlargement; a deformable resilient locking element within the bell portion slidably mounted therein for movement in the direction of said longitudinal axis, said locking element comprising a plurality of radially extending circumferentially spaced substantially rigid locking portions resiliently connected into an annulus and movable along the compression wall of said bell portion into locking position with the locking element between the flange and the spherical enlargement and having an inner diameter less than the outer diameter of the spherical enlargement preventing accidental separation of said pipe sections in extended position under positive internal pressure, relative rotation of said bell and spigot portions about the respective longitudinal axes deflecting said substantially rigid portions out of said locking position to permit relative longitudinal separation of said pipe section; an annular elastomeric sealing means in the space between the spherical enlargement and the bell portion having axially inwardly and outwardly directed pairs of spaced sealing lips, said sealing means being slidably mounted in said bell portion and bearing against said locking element with said outwardly directed pair of sealing lips engaging said locking element and being compressed between the spherical enlargement and the compression wall with the coupling subjected to positive internal pressure and the pipe sections in lengthened position, said sealing means, said locking means and said spherical enlargement being moved away from said internal compression wall and said spherical enlargement engaging with and forming a bearing with said annular restriction permitting relative angular movement of said pipe sections, said resilient locking element expanding outward along said interior compression wall and thereby remaining in contact with said outwardly directed pair of sealing lips on movement of said seal means toward said restriction to maintain said outwardly directed sealing lips in sealing engagement with the opposed surfaces of said bell and spigot portions when said pipe sections are in retracted position and the coupling is subjected to internal negative pressure.

2. The structure as defined in claim 1, wherein the bell portion includes a generally cylindrical section adjacent to and connected to the interior compression wall and a surface sloping toward said annular restriction, said last mentioned surface comprising a compressing means for the inwardly directed pair of sealing lips.

3. The structure as defined in claim 1, wherein the radial inner and outer curves of the annular elastomeric sealing means are substantially circular, the radial inner curve comprising a plurality of substantially circular curves, one curve having a radius several times that of an adjacent curve.

(References on following page)

References Cited in the file of this patent

UNITED STATES PATENTS

| | | |
|---|---|---|
| 2,165,052 | Hering | July 4, 1939 |
| 2,470,883 | Boissou | May 24, 1949 |
| 2,587,794 | Walker | Mar. 4, 1952 |
| 2,638,362 | Sherman | May 12, 1953 |
| 2,687,229 | Laurent | Aug. 24, 1954 |
| 2,688,506 | Bakker | Sept. 7, 1954 |

OTHER REFERENCES

Ser. No. 293,149, Boissou (A. P. C.), published May 25, 1943.